United States Patent [19]

Geerdes et al.

[11] 4,447,567

[45] May 8, 1984

[54] AQUEOUS, OXIDATIVELY DRYING COATING COMPOSITION

[75] Inventors: Dirk J. F. Geerdes, Hoogerheide; Petrus J. C. Nelen, Ossendrecht, both of Netherlands

[73] Assignee: Akzo nv, Arnhem, Netherlands

[21] Appl. No.: 452,927

[22] Filed: Dec. 27, 1982

[30] Foreign Application Priority Data

Dec. 29, 1981 [NL] Netherlands .................. 8105879

[51] Int. Cl.$^3$ .................. C08L 51/08; C09D 3/64; C09D 3/68

[52] U.S. Cl. .................. 523/501; 106/264; 523/500; 523/502

[58] Field of Search .................. 523/501, 500, 502; 106/264

[56] References Cited

U.S. PATENT DOCUMENTS 4,094,836 6/1978 Yasui et al. .................. 523/501
4,116,903 9/1978 Lietz et al. .................. 523/501
4,293,471 10/1981 Heiberger .................. 106/264

Primary Examiner—Ronald W. Griffin
Attorney, Agent, or Firm—Stevens, Davis, Miller & Mosher

[57] ABSTRACT

An aqueous, oxidatively drying coating composition is provided, the binder system of which comprising (A) the polymer obtained by polymerization of a monoethylenically unsaturated compound in the presence of (B) an aqueous solution of an ionized, oxidatively drying alkyl resin, and (C) a dispersed, oxidatively drying alkyd resin having a number average molecular weight of 600–6000, a viscosity of at most 30 Pa.s, measured at 20° C., an acid number of 0–20 and a hydroxyl number of 0–130, and built up of 3–40% by weight of a hydroxyl compound, 2–44% by weight of a carboxylic acid including a cycloaliphatic dicarboxylic acid, and 20–90% by weight of an ethylenically unsaturated fatty acid. Calculated on solid matter, component C forms 5–65% by weight of the binder system. The coating composition is preferably applied to wood.

10 Claims, No Drawings

AQUEOUS, OXIDATIVELY DRYING COATING COMPOSITION

The invention relates to an aqueous, oxidatively drying coating composition based on a binder system obtained by polymerization of one or more monoethylenically unsaturated compounds in the presence of an aqueous solution of an ionized, oxidatively drying alkyd resin.

A coating composition of the type indicated above is known from U.S. Pat. No. 4,116,903. In actual practice, however, the gloss of the final coating and the brushability and properties such as hiding power, workability and filling of surface irregularities in the substrate, which are connected with a low solids content, are not quite satisfactory. An object of the present invention is to provide a coating composition which guarantees an optimum combination of said properties while retaining the other desired properties. Moreover, the composition may display a very good hydrolytic resistance.

The coating composition according to the invention is characterized in that per 100 parts by weight (calculated on solid matter) the binder system also contains 5–65 parts by weight (calculated on solid matter) of a dispersed, oxidatively drying alkyd resin having a number average molecular weight in the range of 600–6,000, a viscosity not higher than 30 Pa.s, measured at 20° C., an acid number of 0–20 and a hydroxyl number of 0–130, which is substantially built up of 3–40% by weight of a hydroxyl compound having 2–8 hydroxyl groups, 2–44% by weight of a di- and/or multivalent carboxylic acid, of which 20–100 mole % is a cycloaliphatic dicarboxylic acid, and 20–90% by weight of an ethylenically unsaturated monocarboxylic acid having 6–24 carbon atoms.

The ionized, oxidatively drying alkyd resin may be prepared by polycondensation of generally one or more aliphatic and/or cycloaliphatic di- and/or multivalent and, if desired, monovalent alcohols with one or more aliphatic, cycloaliphatic and/or aromatic di- and/or multivalent and, if desired, monovalent carboxylic acids, and/or derivatives of such alcohols or carboxylic acids, such as epoxy compounds, esters or acid anhydrides.

Alcohols that are preferably used are the compounds of the formula $HOCH_2—CR_1CR_2—CH_2OH$, where $R_1$ represents a $—CH_2OH$ group, a group $R_2$ or an acryloyl group or methacryloyl group, and $R_2$ represents a hydrocarbon group carrying an inert substituent or not, for instance an alkyl group having 1–4 carbon atoms, an aryl group having 6–14 carbon atoms, chloromethyl, nitropropyl or p-acetophenyl. Representative alcohols that are preferably used are: trimethylol ethane, trimethylol propane, trimethylol butane, 2,2-dimethyl-1,3-propane diol, 2-methyl-2-propyl-1,3-propane diol, 2-ethyl-2-butyl-1,3-propane diol and 2-methyl-2-phenyl-1,3-propane diol. More particularly, use is made of trimethylol propane. The preferably employed alcohols are generally used in an amount of 2–98 mole %, more particularly 2–90 mol %, of the total amount of hydroxyl group-containing compounds to be subjected to polycondensation. Examples of suitable alcohols further include: 1,2-propylene glycol, propylene oxide, 1,4-dimethylol cyclohexane, perhydrobisphenol, glycerol, glycidol, pentaerythritol and etherification products of polyvalent alcohols, for instance: di-, tri-, tetra- and a polypentaerythritol.

As examples of suitable di- or polyvalent carboxylic acids may be mentioned: succinic acid, adipic acid, trimethyl adipic acid, sebacic acid, dimerised fatty acids, tetrahydrophthalic acid, 3,6-endomethylene tetrahydrophthalic acid, 3,6-endomethylene cyclohexane-1,2-dicarboxylic acid, cyclopentane-1,2-dicarboxylic acid or a homologue thereof, 5-carboxy-4-hexyl-2-cyclohexene-1-octanoic acid, 6-carboxy-4-hexyl-2-cyclohexene-1-octanoic acid, orthophthalic aid, isophthalic acid, terephthalic acid and trimellitic acid. If desired, one or more of these acids may be used as anhydride or in the form of an ester. Optionally, use may be made of small amounts of unsaturated acids such as maleic acid, fumaric acid and itaconic acid. It is preferred that as carboxylic acid there should be used orthohexahydrophthalic acid and/or the anhydride thereof and/or a homologue thereof, such as methylorthohexahydrophthalic acid. Incorporation of orthohexahydrophthalic acid units or a homologue of that acid into the oxidatively drying alkyd resin imparts excellent hydrolytic resistance to it; a far better resistance is obtained than upon the incorporation of phthalic acid, isophthalic acid, terephthalic acid or tetrahydrophthalic acid. The preferably employed di- or polyvalent carboxylic acids are generally used in an amount of 5–60 mole %, more particularly 10–55 mole %, of the total amount of carboxyl group-containing compounds to be subjected to polycondensation. Optionally, the di- or polyvalent carboxylic acids may be replaced in an amount of up to 50 mole % with aliphatic, cycloaliphatic and/or aromatic polyisocyanates, such as hexamethylene diisocyanate, isophoron diisocyanate or toluene diisocyanate.

In order to obtain the oxidatively drying character the ionized, oxidatively drying alkyd resin contains one or more ethylenically unsaturated monocarboxylic acids, preferably polyunsaturated fatty acids having isolated double bonds, which acids generally contain 6–24 carbon atoms and occur in, int. al., linseed oil fatty acid, safflower oil fatty acid, soybean oil fatty acid and tall oil fatty acid. If desired, not more than 30% by weight of the fatty acid having isolated double bonds may be replaced with a fatty acid having such conjugated double bonds as occur in tung oil fatty acid and oiticica oil. If desired, the fatty acid may be used as such and/or in the form of a triglyceride.

Besides the ethylenically unsaturated monocarboxylic acid use may be made of one or more saturated, aliphatic, cycloaliphatic and/or aromatic monocarboxylic acids having 6–24 carbon atoms. As examples of monocarboxylic acids that are preferably used may be mentioned: benzoic acid, hexahydrobenzoic acid, 2-ethyl hexanoic acid, 2,5-dimethyl benzoic acid, p-tert. butyl benzoic acid and pivalic acid. The monocarboxylic acid is usually employed in an amount such that the ionized, oxidatively drying alkyd resin is built up of 25–85% by weight, preferably 35–75% by weight of such an acid. Besides the ethylenically unsaturated monocarboxylic acid there may, if desired, also be used compounds which for instance have an allyl ether group. Examples of suitable allyl ether compounds include the allyl ethers of trimethylol propane, glycerol, pentaerythritol or sorbitol, and those of epoxy compounds, for instance: allyl glycidyl ether. These allyl compounds should contain at least one hydroxyl group or epoxy group. It is preferred that use should be made of a mono- or diallyl ether of trimethylol propane. Generally, the oxidatively drying alkyd resin is built up of 0–45% by weight of such an allyl compound. The oxidatively drying alkyd resin generally contains on average 2–20, preferably 2–12, oxidatively drying bonds per macromolecule.

The ionized, oxidatively drying alkyd resin is further built up preferably of a dihydroxy carboxylic acid of the formula R—C(CH$_2$OH)$_2$—COOH, where R represents a hydrocarbon group having 1–14 carbon atoms and carrying an inert substituent or not, for instance an alkyl group having 1–4 carbon atoms, an aryl group having 6–14 carbon atoms, chloromethyl, nitropropyl or p-acetophenyl. It is preferred that use should be made of dimethylol propionic acid. It is preferred that the dihydroxy carboxylic acid should be used in an amount of 5–75 mole %, more particularly 10–60 mole %, of the total amount of the carboxyl group-containing compounds to be subjected to polycondensation.

The polycondensation reaction for preparing the oxidatively drying alkyd resin is generally carried out at a temperature in the range of 140° to 300° C., preferably 180°–260° C., and in an inert atmosphere of, say, nitrogen and/or carbon dioxide. The water evolved during polycondensation may be removed in the usual manner, for instance by distillation under reduced pressure or by azeotropic distillation, using an organic solvent, for instance: toluene or xylene. Upon completion of the polycondensation the solvents may be removed, if desired, from the alkyd resin by distillation.

The polycondensation reaction is continued until the alkyd resin has the desired acid number of 30–100, preferably 40–60, a hydroxyl number of 0–175, preferably 20–120, and a number average molecular weight of 1,000–12,000, preferably 2,000–8,000. Subsequently, at least part, preferably 50–100%, of the acid grops of the alkyd resin is neutralized with a basic compound, such as ammonia or a monoamine, to ionize the oxidatively drying alkyd resin, in order that the alkyd resin may be satisfactorily soluble in water. As suitable amines may be mentioned the usual alkyl amines, cycloalkyl amines, heterocyclic amines and hydroxyl amines. The monoamines may be of a primary, a secondary or a tertiary nature. It is preferred that use should be made of tertiary alkyl amines having a boiling point below 150° C., for instance: triethylamine and dimethylisopropylamine. The aqueous solution of the ionized alkyd resin generally has a ph of 5–9.

Prior to ionization of the alkyd resin some desirable amount of a water-miscible organic solvent is usually added to it to set the viscosity and the rate of evaporation required upon application of the composition. It is preferred that the organic solvent should be used in an amount of 0–30% by weight, based on the total amount of solvent, including water. Examples of suitable organic solvents include: propanol, n-butanol, isobutanol, propoxypropanol, butoxyethanol, ethylene glycol, propylene glycol, diethylene glycol, ethylene glycol monomethyl ether, ethylene glycol monobutyl ether, methyl ethyl ketone, methyl isobutyl ketone, and a monoalkyl ether, for instance: the methyl ether, the ethyl ether, the n-butyl ether or the isobutyl ether, of 1,2-propylene glycol.

Preparation of the second binder component is carried out by polymerization of one or more monoethylenically unsaturated compounds in the presence of an aqueous solution of the afore-described ionized alkyd resin.

Examples of suitable monomers include aromatic compounds, such as styrene, vinyl toluene, α-methyl styrene, acrylic or methacrylic esters, such as methyl methacrylate, ethyl acrylate, butyl acrylate, hydroxypropyl acrylate, hydroxyethyl methacrylate, 2-ethylhexyl acrylate, dodecyl acrylate and isobornyl (meth)acrylate; nitriles, such as acrylonitrile and methacrylonitrile; and compounds such as vinyl chloride, vinyl acetate and vinyl propionate. It is preferred that use should be made of styrene and/or an acrylic or methacrylic ester of an alcohol having 1–24 carbon atoms, such as methyl methacrylate, butyl acrylate, butyl methacrylate, lauryl methacrylate and stearyl acrylate. If desired, α,β-monoethylenically unsaturated carboxylic acids, for instance: acrylic acid, methacrylic acid, crotonic acid and maleic acid, may be copolymerized in small amounts of, say, 0.1–3% by weight, based on the total weight of the monomers. If desired, also other monomers may be used, for instance compounds having an oxidatively drying group, such as acrylic or methacrylic esters of oleyl alcohol or linoleyl alcohol, fatty acid esters of hydroxyalkyl (meth)acrylates, dicyclopeptenyl (meth)acrylate and dicyclopentenyloxyethyl (meth)acrylate. It is preferred that the monomers and the ratios between them should so be chosen that the calculated glass transition temperatue (Tg) of the prepared polymer as such is in the range of −30° to 120° C. and preferably between −10° and 80° C.

The weight ratio of the polymer obtained by polymerization to the ionized alkyd resin is generally such that the total binder system contains 15–75% by weight, preferably 20–60% by weight of the polymer and 20–80% by weight, preferably 30–70% by weight of the ionized alkyd resin, all percentages being based on the weight of the solid in the total binder system.

Polymerization of the monomeric compound(s) takes place at a temperature of 30°–95° C., preferably 60°–85° C., in the presence of at least one radical initiator, optionally while use is made of ultraviolet radiation. Generally, use is made of initiators having a half-life period such at the chosen polymerization temperature that a certain amount of initiator is present throughout the polymerization reaction.

As examples of suitable radical initiators may be mentioned: 2,2′-azobisisobutyronitrile, 2,2′-azobis(2,4-dimethylvaleronitrile), benzoyl peroxide, tert. butyl peroctoate, methyl ethyl ketone peroxide, sodium persulphate and potassium persulphate. The initiator is usually employed in an amount of 0.2–6, preferably 0.5–4% by weight, based on the total weight of the monomers. If desired, the initiators may be added to the polymerization mixture batch-wise. The polymerization may be carried out by any usual method, for instance by gradually adding a mixture of the monomeric compound(s) and the radical initiator to an aqueous solution of the afore-described ionized, oxidatively drying alkyd resin. According to the present invention the aqueous solution of the oxidatively drying alkyd resin may also contain dispersed therein a third binder component, which will be described hereinafter in detail.

According to the invention the binder system contains as third component a dispersed, oxidatively drying alkyd resin having a number average molecular weight of 600–6,000, an acid number of 0–20 and a hydroxyl number of 0–130. It is preferred that the number average molecular weight, the acid number and the hydroxyl number have values of 800–4,000, 4–12 and 10–100, respectively.

The viscosity of the dispersed alkyd resin as such is not higher than 30 Pa.s, preferably lower than 15 Pa.s measured at 20° C.

The dispersed, oxidatively drying alkyd resin may be built up of components of the same groups of compounds as are used in the preparation of the ionized alkyd resin and they may be prepared in a similar manner. It is not necessary, however, for the two alkyd resins in one coating composition to be built up of exactly the same compounds. The preparation of the dispersed alkyd resin should, of course, be so carried out that a product is obtained which satisfies the afore-mentioned requirements and, moreover, is substantially built up of 3-40% by weight of a hydroxyl compound having 2-8 hydroxyl groups, 2-44% by weight of a di- and/or multivalent carboxylic acid, of which 20-100 mole % is a cycloaliphatic dicarboxylic acid, and 20-90% by weight of an ethylenically unsaturated monocarboxylic acid having 6-24 carbon atoms.

Moreover, in one or in both oxidatively drying alkyd resins there may optionally be chemically incorporated or physically mixed therewith such compounds as will cause degradation of coatings by incident sunlight to be considerably reduced. As examples of these compounds, which may be present in an amount of 0.1-10% by weight, based on the alkyd resin, there may be mentioned compounds that have a benotriazole or a benzophenone structure, such as 4,4′-dihydroxyethoxy-2,2′-dihydroxybenzophenone and/or aliphatic hydroxyl groups-containing derivatives of 2-(2-hydroxyphenyl)-benzotriazole.

The 3 binder components of the binder system according to the invention each have a calcuated solubility parameter which differs from those of the two other components by not more than 1.7 units, the solubility parameter of the dispersed alkyd resin not being higher than 10.5. As a result, the binder system displays excellent mutual compatability, resulting in a high degree of gloss of the coating upon application of the pigmented or non-pigmented coating composition obtained. The solubility parameters of the alkyd resins can be calculated using the constants of attraction of the separate groups, the specific gravity and the molecular weight [see J. Appl. Chem. 3, 71 (1953)]. The solubility parameter of the addition polymer is calculated by applying the equation $$\delta = \frac{\Sigma n G}{\Sigma n V_m}$$

where n is the number of moles of the monomeric compound, G the constant of molar attraction of the polymer unit and $V_m$ the molar volume of the polymer unit.

Optionally, the coating composition according to the invention may contain all kinds of additives, for instance: pigments, colourants, siccatives, dispersing agents, levelling agents, light stabilizers and fillers.

As examples of suitable siccatives may be mentioned metal salts of (cyclo)aliphatic acids, such as octanoic acid, linoleic acid and naphthenic acid, examples of suitable metals including cobalt, manganese, lead, zirconium, calcium, zinc and rare earth metals. It is also possible to use mixtures of siccatives. Usually, the siccatives (calculated as metal) are applied in an amount of 0.001 to 0.5% by weight, calculated on the binder system as solid matter.

The pigments, fillers and outer adjuvants may be added to the aqueous coating composition directly and be dispersed therein under the influence of shearing forces. Alternatively, first a pigment paste may be prepared which is based on at least part of the dispersed, water-undilutable, hardly or not water-ionizable alkyd resin to be used in the final coating composition, and the pigment paste thus prepared be added to the aqueous coating composition containing the other components of the binder system according to the invention. It is preferred, however, that first a pigment paste should be prepared which is based on part of the (non-pigmented) coating composition according to the invention and this pigment paste is subsequently added to the remaining amount of the coating composition, to which siccatives and other additives may have been added beforehand, if desired.

In actual practice the coating composition is generally applied to a particular substrate by brushing or spraying, but some other method of application is also possible, of course. As substrate there may be used a pretreated or non-pretreated metal, but preferably wood.

The invention will be further described in but not limited by the following examples. In them, unless otherwise indicated, the solids content is determined by heating the composition for 1 hour at 105° C. in conformity with ASTM D 1650, the colour is determined by the Gardner 1933-scale and the viscosity with the aid of an Epprecht viscosity meter at 20° C. and expressed in Pa.s. The values for the acid number and the hydroxyl number are given in mg KOH per gramme of solid resin. In the examples parts are parts by weight and % is percent by weight, unless otherwise indicated.

PREPARATION OF OXIDATIVELY DRYING, WATER-DILUTABLE ALKYD RESINS

Example A

An oxidatively drying, water-dilutable alkyd resin was prepared in a reaction vessel equipped with a thermometer, a stirrer, a condenser and a separating vessel, by intermixing 188 g (0.650 moles) of tall oil fatty acid, 45.5 g (0.296 moles) of hexahydrophthalic anhydride, 139.3 g (1.040 moles) of dimethylol propionic acid, 14.5 g (0.108 moles) of trimethylol propane and 15.0 g of xylene. These compounds were heated to 225° C. over a four-hour period and kept at that temperature until the reaction mixture had an acid number of 46. Subsequently, the xylene was removed from the reaction mixture under reduced pressure and after the mixture had been cooled to 150° C., 119 g of ethylene glycol monobutyl ether were added to it. There were obtained 475 g of a water-dilutable solution of an alkyd resin, with the solution and the alkyd resin having the properties mentioned in Table 1.

Example B

In the reaction vessel according to Example A an oxidatively drying, water-dilutable alkyd resin was prepared by intermixing 89.60 g (0.320 moles) of safflower oil fatty acid, 13.86 g (0.090 moles) of hexahydrophthalic anhydride, 67.00 g (0.500 moles) of dimethylol propionic acid, 2.0 g (0.015 moles) of trimethylol propane and 5.0 g of xylene.

These compounds were heated to 230° C. over a period of 3½ hours, at which temperature they were kept until the reaction mixture had an acid number of 45. Subsequently, the xylene was removed from the reaction mixture under reduced pressure and after the mixture had been cooled to 150° C., 53 g of ethylene glycol monobutyl ether were added to it. There were obtained 211 g of a water-dilutable solution of an alkyd resin, with the solution and the alkyd resin having the properties mentioned in Table 1.

Example C

In the reaction vessel according to Example A an oxidatively drying, water-dilutable alkyd resin was prepared by intermixing 44.7 g (0.160 moles) of linseed oil fatty acid, 44.8 g (0.160 moles) of sunflower oil fatty acid, 34.7 g (0.136 moles) of dipentaerythritol and 6.0 g of xylene. The mixture was heated to 230° C. over a period of 4 hours and kept at this temperature until the reaction mixture had an acid number of 9. Subsequently, 12.5 g (0.093 moles) of trimethylol propane, 31.8 g (0.215 moles) of phthalic anhydride and 6.7 g (0.050 moles) of dimethylol propionic acid were added to the reaction mixture. The reaction mixture was again heated to 230° C. over a period of 1½ hours and kept at this temperature until the reaction mixture had an acid number of 21. On the strength of the degree of polycondensation corresponding to the acid number of 21 and the difference in reactivity between the primary carboxyl groups of the phthalic acid and the tertiary carboxyl group of the dimethylol propionic acid it is assumed that practically all of the phthalic anhydride has undergone polycondensation.

Next, the reaction mixture was cooled to 200° C. and 15.3 g (0.100 moles) of hexahydrophthalic anhydride were added. The reaction mixture was kept at 200° C. until the acid number thereof was 43. Finally, the xylene was removed from the reaction mixture under reduced pressure and after the mixture had been cooled to 150° C., 60.0 g of ethylene glycol monobutyl ether were added to it. The product obtained consisted of 240 g of a water-dilutable solution of an alkyd resin, the solution and the alkyd resin having the properties mentioned in Table 1.

TABLE 1

| Properties | Examples | | |
|---|---|---|---|
| Solution | A | B | C |
| Solids content (wt.%) | 75 | 75 | 75 |
| Viscosity (Pa.s) | 0.86 | 0.65 | 5.85 |
| Gardner colour | 5–6 | 6 | 8 |
| Alkyd resin | | | |
| Acid number | 45 | 43 | 41 |
| Hydroxyl number | 63 | 59 | 102 |
| Fatty acid content (wt.%) | 52.8 | 56.6 | 49.6 |
| Calculated solubility parameter | 10.45 | 10.23 | 10.94 |
| Number average molecular weight | 3800 | 3400 | 3800 |

PREPARATION OF WATER-INSOLUBLE, OXIDATIVELY DRYING ALKYD RESINS

Example D

A water-insoluble, oxidatively drying alkyd resin was prepared in a reaction vessel according to Example A by intermixing therein 159.6 g (0.57 moles) of safflower oil fatty acid, 17.1 g (0.08 moles) of trimethylol propane diallyl ether, 33.1 g (0.215 moles) of hexahydrophthalic anhydride, 33.1 g (0.238 moles) of pentaerythritol and 8 g of xylene.

These compounds were heated to 230° C. over a period of 4 hours and kept at this temperature until the reaction mixture had an acid number of 8. Subsequently, the xylene was removed from the reaction mixture under reduced pressure. The product obtained consisted of 229 g of an alkyd resin having the properties mentioned in Table 2.

Example E

In the reaction vessel according to Example A a water-insoluble, oxidatively drying alkyd resin was prepared by intermixing 139.0 g (0.500 moles) of sunflower fatty acid, 31.3 g (0.233 moles) of trimethylol propane, 26.8 g (0.200 moles) of dimethylol propionic acid, 8.9 g (0.058 moles) of hexahydrophthalic anhydride, 11.8 g (0.061 moles) of trimellitic anhydride and 9.0 g of xylene.

These compounds were heated to 240° C. over a period of 3½ hours and kept at this temperature until the reaction mixture had an acid number of 12.5. Subsequently, the xylene was removed from the reaction mixture under reduced pressure. There were obtained 204 g of an alkyd resin having the properties mentioned in Table 2.

Example F

In the reaction vessel according to Example A a water-insoluble, oxidatively drying alkyd resin was prepared by intermixing 135 g (0.482 moles) of tall oil fatty acid, 23.0 g (0.107 moles) of trimethylol propane diallyl ether, 32.4 g (0.234 moles) of pentaerythritol, 0.2 g (0.002 moles) of maleic anhydride, 29.6 g (0.200 moles) of phthalic anhydride, 9.2 g (0.060 moles) of hexahydrophthalic anhydride and 10.0 g of xylene. These compounds were heated to 240° C. over a period of 3½ hours and kept at this temperature until the reaction mixture had an acid number of 10.0. Subsequently, the xylene was removed from the reaction mixture under reduced pressure. There were obtained 217 g of an alkyd resin having the properties mentioned in Table 2.

Example G

In the reaction vessel according to Example A a water-insoluble, oxidatively drying alkyd resin was prepared by intermixing 140.7 g (0.503 moles) of soy bean oil fatty acid, 20.8 g (0.082 moles) of dipentaerythritol, 22.2 g (0.166 moles) of trimethylol propane and 10.0 g of xylene. The mixture was heated to 210° C. over a period of 3 hours and kept at this temperature until the reaction mixture had an acid number of 8.

Subsequently, 26.7 g (0.124 moles) of trimethylol propane diallyl ether, 12.7 g (0.086 moles) of phthalic anhydride, 7.6 g (0.050 moles) of hexahydrophthalic anhydride and 14.5 g (0.075 moles) of trimellitic anhydride were added to the reaction mixture. Next, the reaction mixture was heated to 240° C. over a period of 2 hours and kept at this temperature until the reaction mixture had an acid number of 8. Then the xylene was removed from the reaction mixture under reduced pressure. There were obtained 230 g of an alkyd resin having the properties mentioned in Table 2.

TABLE 2

| Properties | Examples | | | |
|---|---|---|---|---|
| | D | E | F | G |
| Solids content (wt.%) | 99.8 | 99.6 | 99.7 | 99.7 |
| Viscosity (Pa.s) | 3.62 | 3.85 | 7.75 | 1.0 |
| Acid number | 7.6 | 11 | 9 | 6.9 |
| Hydroxyl number | 17 | 38 | 21 | 34 |
| Fatty acid content (wt.%) | 69.0 | 68.8 | 63.1 | 60.5 |
| Calculated solubility parameter | 9.47 | 9.69 | 9.79 | 9.64 |
| Number average molecular | 1790 | 2200 | 1850 | 2020 |

TABLE 2-continued

| Properties | Examples | | | |
|---|---|---|---|---|
| | D | E | F | G |
| weight | | | | |
| Gardner colour | 6 | 7 | 6 | 8 |

PREPARATION OF NON-PIGMENTED COATING COMPOSITIONS

Example 1

In a reaction vessel equipped with a thermometer and a stirrer an aqueous dispersion was prepared by heating in it, with stirring, 475 parts of the alkyd resin solution according to Example A to 80° C., at which temperature the solution was neutralized with 31.6 parts of dimethylethanolamine. After 15 minutes there was gradually added a mixture of 34 parts of ethylene glycol monobutyl ether and 534 parts of demineralized water and a clear aqueous resin solution was obtained.

To this solution there was added at 80° C. over a period of 2 hours a mixture consisting of 43.1 parts of styrene, 125.0 parts of methyl methacrylate, 176.8 parts of butyl methacrylate, 5.3 parts of methacrylic acid and 10.0 parts of 2,2'-azobisisobutyronitrile. The calculated value of the solubility parameter of the addition polymer was 9.65, the calculated glass transition temperature 56° C. Two hours after termination of the addition of the monomer-initiator mixture another 3.5 parts of the initiator were added and the polymerization thereof was continued for 4 hours at 80° C. There were obtained 1433 parts of a stable aqueous dispersion having a solids content of 49.3% and a viscosity of 9.75 Pa.s.

To the resulting dispersion there were subsequently added, with stirring, 177 parts of the oxidatively drying alkyd resin according to Example D. There were obtained 1610 parts of a coating composition having a solids content of 54.8%, a viscosity of 8.63 Pa.s and a particle size of 250–1400 nm.

Example 2

In the reaction vessel according to Example 1 491 parts of the alkyd resin solution according to Example B were heated, with stirring, to 80° C., at which temperature the solution was neutralized with 25 parts of dimethylethanolamine. After 15 minutes there was gradually added a mixture of 54 parts of ethylene glycol monobutyl ether and 620 parts of demineralized water and a clear aqueous solution was obtained. Over a period of 3 hours and at a temperature of 80° C. there was added to this solution a mixture of 320 parts of butyl methacrylate, 113 parts of methyl methacrylate, 7 parts of methacrylic acid and 8.4 parts of 2,2'-azobisisobutyronitrile. The calculated value of the solubility parameter of the addition polymer was 9.56, the calculated glass transition temperature 40° C. Three hours after termination of the addition of the monomer-initiator mixture 4.2 parts of the initiator were added and the polymerization reaction was thereafter continued for 4 hours at 80° C. There were obtained 1635 parts of a stable, aqueous dispersion having a solids content of 49.6% and a viscosity of 14.52 Pa.s.

To the resulting dispersion there were subsequently added, with stirring, 540 parts of the oxidatively drying alkyd resin according to Exampl E. There were obtained 2175 parts of a coating composition having a solids content of 62.1%, a viscosity of 11.34 Pa.s and a particle size of 250–1100 nm.

Example 3

The procedure of Example 2 was repeated, except that the water-insoluble alkyd resin was added to the clear aqueous solution of the oxidatively drying alkyd resin before the monomeric compounds were added to the aqueous solution of the alkyd resin and polymerized. There were obtained 2175 parts of an aqueous coating composition having a solids content of 62.1%, a viscosity of 13.06 Pa.s and a particle size of 300–1200 nm.

Example 4

In a reaction vessel fitted with a thermometer and a stirrer an aqueous dispersion was prepared by intermixing 547 parts of the alkyd resin solution according to Example C and 168 parts of ethylene glycol monobutyl ether and heating to 80° C., with stirring. At this temperature the mixture was neutralized with 30 parts of dimethylethanolamine. After 15 minutes 915 parts of demineralized water were gradually added and a clear aqueous resin solution was obtained. Over a period of 2 hours and at a temperature of 80° C. there was added to this solution a mixture of 80.0 parts of styrene, 112.0 parts of methyl methacrylate, 200.0 parts of butyl methacrylate, 8.0 parts of methacrylic acid and 8.0 parts of 2,2'-azobisisobutronitrile. The calculated value of the solubility parameter of the addition polymer was 9,61, the calculated glass transition temperature 56° C. Subsequently, 3 hours after termination of the addition of the monomer-initiator mixture another 4 parts of the initiator were added and the polymerization reaction was thereafter continued for 4 hours at 80° C.

There were obtained 2050 parts of a stable aqueous dispersion having a solids content of 39.8% and a viscosity of 2.51 Pa.s.

To the resulting dispersion there were subsequently added, with stirring, 816.0 parts of the oxidatively drying alkyd resin according to Example F. There were obtained 2860 parts of a coating composition having a solids content of 56.9%, a viscosity of 3.62 Pa.s and a particle size of 300–1200 nm.

Example 5

In a reaction vessel equipped with a thermometer and a stirrer an aqueous dispersion was prepared by intermixing 653.0 parts of the alkyd resin solution according to Example A and 17.4 parts of ethylene glycol monobutyl ether and heating, with stirring, to 80° C. At this temperature the mixture was neutralized with 43.5 parts of dimethylethanolamine. After 15 minutes 586 parts of demineralized water were gradually added and a clear aqueous resin solution was obtained.

Over a period of 2 hours and at a temperature of 80° C. there was added to this solution a mixture of 98.0 parts of styrene, 92.0 parts of butyl methacrylate, 24.5 parts of methyl methacrylate, 26 parts of 2-hydroxypropyl methacrylate, 61.0 parts of linoleyl acrylate, 4.6 parts of methacrylic acid and 10.0 parts of 2,2'-azobisisobutyronitrile. The calculated value of the solubility parameter of the addition polymer was 9.41, the calculated glass transition temperature 18° C. Subsquently, 2 hours after termination of the addition of the monomer-initiator mixture another 3.5 parts of the initiator were added and the polymerization reaction was continued for 4 hours at 80° C. There were obtained 1600 parts of a stable aqueous dispersion having a solids content of 50.1% and a viscosity of 10.29 Pa.s.

To the resulting dispersion there were subsequently added, with stirring, 200.0 parts of the oxidatively drying alkyd resin according to Example D. There were obtained 1800 parts of a coating composition having a solids content of 55.5% a viscosity of 13.8 Pa.s and a particle size of 200–1200 nm.

Example 6

In a reaction vessel fitted with a thermometer and a stirrer 600 parts of an alkyd resin solution according to Example B were heated, with stirring, to 80° C., at which temperature the solution was neutralized with 30.6 parts of dimethylethanolamine.

After 15 minutes a mixture of 27 parts of 1-butoxy-2-propanol and 620 parts of demineralized water were gradually added and a clear aqueous resin solution was obtained.

Over a period of 3 hours and at a temperature of 80° C. there was added to this solution a mixture of 108.0 parts of styrene, 72.0 parts of methyl methacrylate, 175.0 parts of butyl methacrylate, 5.0 parts of methacrylic acid and 6.0 parts of 2,2'-azobisisobutyronitrile. The calculated value of the solubility parameter of the addition polymer was 9.57, the calculated glass transition temperature 57° C. Subsequently, 3 hours after termination of the addition of the monomer-initiator mixture another 3.0 parts of the initiator were added and the polymerization reaction was continued for 4 hours at 80° C. There were obtained 1640 parts of a stable aqueous dispersion having a solids content of 49.8% and a viscosity of 7.93 Pa.s.

To the resulting dispersion there were subsequently added, with stirring, 272 parts of the oxidatively drying alkyd resin according to Example G. There were obtained 1912 parts of a coating composition having a solids content of 56.9%, a viscosity of 9.22 Pa.s and a particle size of 200–1000 nm.

Comparative Example

The procedure of Example 4 was repeated, with the exception that the monomer mixture used in the preparation of the addition polymer consisted of 50.0 parts of styrene, 342 parts of isobutyl methacrylate and 8.0 parts of methacrylic acid. The calculated value of the solubility parameter of the addition polymer was 9.04 and therefore 1.90 units below that of the water-dilutable alkyd resin. The calculated glass transition temperature of the addition polymer was 55° C.

There were obtained 2048 parts of an aqueous dispersion having a solids content of 39.2%, a viscosity of 3.24 Pa.s and a particle size of 250–1400 nm. The dispersion was applied to a glass plate to a layer thickness of 90 μm. After the coating had dried, it had a dull and inhomogeneous appearance.

PREPARATION OF PIGMENTED COATING COMPOSITIONS AND TESTING THEM

From the aqueous, non-pigmented coating compositions obtained in each of the Examples 1–6 first of all pigment pastes were prepared by intermixing the non-pigmented coating composition, water and butoxyethanol or 1butoxy-2-propanol in the parts by weight mentioned in Table 3 and 70 parts of titanium dioxide (available under the trade mark Kronos 2190 of Kronos Titan GmbH), 0.1 part of a defoaming agent (a modified polysiloxane copolymer available under the trake mark Byk VP 020 of Byk-Mallinckrodt) and 0.1 part of an anionic dispersing agent (based on unsaturated acid esters available under the trade mark Bykumen WS of Byk-Mallinckrodt) and grinding the mixture in a dispersing machine (commercially available under the trade mark Red Devil) to a pigment particle size not greater than 10 m. The resulting pigment pastes had a viscosity at 20° C. of 40–50 sec (DIN cup No. 4).

Subsequently, each of the pigment pastes was mixed with an amount, also mentioned in Table 3, of the non-pigmented coating composition corresponding to that of the example, to which 1 part of a siccative had been added. The siccative was a mixture of cobalt octoate, barium octoate and zirconium octoate (available under the trade mark Trockner 173 of Gebr. Borchers A.G.) containing 1.2% of cobalt, 7.2% of barium and 3.2% of zirconium (calculated as metal). After the pigment paste had been added, the pigmented coating composition was made ready to be processed by adding the solvent in the amount mentioned in Table 3. The compositions had a solids content and a viscosity at 20° C. (DIN cup No. 4) as indicated in Table 3.

TABLE 3

| Constituents | Examples | | | | | |
|---|---|---|---|---|---|---|
| | 1 | 2 | 3 | 4 | 5 | 6 |
| Pigment paste | | | | | | |
| Non-pigmented coating composition | 91.2 | 80.5 | 93.8 | 87.9 | 90.1 | 87.7 |
| Water | 30.0 | 19.0 | 30.0 | 15.0 | 31.0 | 30.0 |
| Butoxyethanol | 10.0 | 6.0 | 10.0 | 5.0 | 11.0 | — |
| 1-Butoxy-2-propanol | — | — | — | — | — | 10.0 |
| Pigmented coating composition | | | | | | |
| Non-pigmented coating composition | 201.4 | 175.7 | 204.0 | 178.1 | 202.3 | 197.9 |
| Water | 25.5 | 8.5 | 26.7 | 10.1 | 28.5 | 24.0 |
| Butoxyethanol | 8.5 | 2.8 | 8.9 | 3.4 | 9.5 | — |
| 1-Butoxy-2-propanol | — | — | — | — | — | 8.0 |
| Solids content (wt. %) | 52.0 | 61.3 | 51.8 | 60.9 | 51.5 | 53.5 |
| Viscosity | 112 | 115 | 114 | 115 | 119 | 117 |

The resulting pigmented coating compositions were applied to a glass plate by means of a knife coater to a coating thickness of 40 μm (after drying) and dried at a temperature of 23° C. The tack-free drying time was determined in accordance with DIN 53150 and of the coating the Persoz hardness (expressed in seconds) was measured after 24 and 72 hours, respectively, and the Gardner gloss at 60° and 20° (ASTM D 523). Of the coating also the resistance to water was measured in conformity with ASTM D 870-54. The rating "good" signifies that the coating has not undergone any visible change after 3 days' immersion in water of 37.8° C., followed by conditioning of the coating for 1 hour at 20° C.

TABLE 4

| Properties | Examples | | | | | |
|---|---|---|---|---|---|---|
| | 1 | 2 | 3 | 4 | 5 | 6 |
| Tack-free drying time (in hours) | 4 | 5 | 5 | 6 | 4 | 5 |
| Persoz-hardness | | | | | | |

TABLE 4-continued

| Properties | Examples | | | | | |
|---|---|---|---|---|---|---|
| | 1 | 2 | 3 | 4 | 5 | 6 |
| after 24 hours | 81 | 50 | 62 | 45 | 89 | 70 |
| after 72 hours | 98 | 69 | 78 | 68 | 105 | 86 |
| Gardner gloss | | | | | | |
| at 60° | 90 | 87 | 84 | 85 | 94 | 88 |
| at 20° | 81 | 75 | 72 | 72 | 88 | 76 |
| Resistance to water | good | good | good | good | good | good |
| Hiding power | reasonable | good | reasonable | good | reasonable | good |
| Filling | moderate | excellent | reasonable | excellent | reasonable | good |

We claim:

1. An aqueous, oxidatively drying coating composition based on a binder system obtained by polymerization of one or more monoethylenically unsaturated compounds in the presence of an aqueous solution of an ionized oxidatively drying alkyd resin, characterized in that per 100 parts by weight (calculated on solid matter) the binder system also contains 5–65 parts by weight (calculated on solid matter) of a dispersed, oxidatively drying alkyd resin having a number average molecular weight in the range of 600–6000, a viscosity not higher than 30 Pa.s, measured at 20° C., an acid number of 0–20 and a hydroxyl number of 0–130, which is substantially built up of 3–40% by weight of a hydroxyl compound having 2–8 hydroxyl groups, 2–44% by weight of a di- and/or multivalent carboxylic acid, of which 20–100 mole % is a cycloaliphatic dicarboxylic acid, and 20–90% by weight of an ethylenically unsaturated monocarboxylic acid having 6–24 carbon atoms, and wherein the three binder components of the binder system each have a solubility parameter, as defined hereinbefore, which differs by not more than 1.7 units from that of the other two binder components, the solubility parameter of the dispersed alkyd resin not being higher than 10.5.

2. The coating composition of claim 1 wherein the dispersed, oxidatively drying alkyd resin has a number average molecular weight of 800–4000, an acid number of 4–12 and a hydroxyl number of 10–100.

3. The coating composition of claim 1 wherein the dispersed, oxidatively drying alkyd resin has a viscosity not higher than 15 Pa.s, measured at 20° C.

4. The coating composition of claim 1 wherein the ionized, oxidatively drying alkyd resin is partly built up of an aliphatic and/or cycloaliphatic di- and/or multivalent alcohol and of orthohexahydrophthalic acid and/or the anhydride thereof and/or a homologue thereof.

5. The coating composition of claim 1 wherein the ionized, oxidatively drying alkyd resin is partly built up of a dihydroxy carboxylic acid of the formula R—C(CH$_2$OH)$_2$—COOH, where R represents a hydrocarbon group carrying an inert substituent or not and having 1–14 carbon atoms.

6. The coating composition of claim 1 wherein the ionized, oxidatively drying alkyd resin is partly built up of dimethylol propionic acid.

7. The coating composition of claim 1 wherein the ionized, oxidatively drying alkyd resin has an acid number of 30–100, a hydroxyl number of 0–175 and a number average molecular weight of 1000–12000.

8. The coating composition of claim 1 wherein the monoethylenically unsaturated compound polymerized in the presence of the ionized, oxidatively drying alkyd resin is styrene and/or an acrylic or methacrylic ester of an alcohol having 1–24 carbon atoms.

9. The coating composition of claim 1 wherein the polymer as such obtained by polymerization of the monoethylenically unsaturated compound(s) has a calculated glass transition temperature in the range of −30° to 120° C.

10. The coating composition of claim 1 wherein the total binder system contains 15–75% by weight of polymer obtained by polymerization of the monoethylenically unsaturated compound(s) and 20–80% by weight of the ionized, oxidatively drying alkyd resin, the percentages being based on the weight of the solid matter of the total binder system.

* * * * *